(12) United States Patent
Van Lierop et al.

(10) Patent No.: US 11,656,341 B2
(45) Date of Patent: May 23, 2023

(54) LIDAR SYSTEM SELECTIVELY CHANGING A SIZE OF THE FIELD OF VIEW

(71) Applicant: Infineon Technologies AG, Neubiberg (DE)

(72) Inventors: Hendrikus Van Lierop, Bj Weert (NL); Norbert Druml, Graz (AT); Alberto Garcia Izquierdo, Graz (AT); Wojciech Kudla, Wageningen (NL)

(73) Assignee: Infineon Technologies AG, Neubiberg (DE)

( * ) Notice: Subject to any disclaimer, the term of this patent is extended or adjusted under 35 U.S.C. 154(b) by 280 days.

(21) Appl. No.: 16/904,170

(22) Filed: Jun. 17, 2020

(65) Prior Publication Data

US 2020/0400788 A1 Dec. 24, 2020

(30) Foreign Application Priority Data

Jun. 24, 2019 (DE) .......................... 102019209112.1

(51) Int. Cl.
  *G01S 7/481* (2006.01)
  *G02B 26/08* (2006.01)
  *G01S 7/4912* (2020.01)
  *G01S 17/89* (2020.01)

(52) U.S. Cl.
  CPC .......... *G01S 7/4817* (2013.01); *G01S 7/4912* (2013.01); *G01S 17/89* (2013.01); *G02B 26/0833* (2013.01)

(58) Field of Classification Search
  CPC .......................... G02B 26/0833; G01S 7/4817
  See application file for complete search history.

(56) References Cited

U.S. PATENT DOCUMENTS

| | | | |
|---|---|---|---|
| 7,542,191 B2 | 6/2009 | Kadowaki | |
| 8,355,013 B2 | 1/2013 | Sprague et al. | |
| 9,612,433 B2 | 4/2017 | McVittie et al. | |
| 9,762,873 B2 | 9/2017 | Honkanen et al. | |
| 11,567,175 B2 | 1/2023 | Roger et al. | |
| 2011/0267501 A1 | 11/2011 | Westhues et al. | |
| 2012/0038903 A1* | 2/2012 | Weimer | G01C 3/08 250/208.2 |
| 2016/0245903 A1 | 8/2016 | Kalscheur et al. | |
| 2018/0106890 A1* | 4/2018 | O'Keeffe | G01S 17/04 |
| 2018/0306905 A1 | 10/2018 | Kapusta et al. | |

(Continued)

FOREIGN PATENT DOCUMENTS

| CN | 101387751 A | 3/2009 |
|---|---|---|
| CN | 103458253 A | 12/2013 |

(Continued)

*Primary Examiner* — Rebecca A Volentine
(74) *Attorney, Agent, or Firm* — Harrity & Harrity, LLP

(57) ABSTRACT

A light detection and ranging (LIDAR) system is provided. The LIDAR system comprises at least two lasers configured to emit aligned beams of light and a mirror configured to deflect the beams of light emitted by the lasers. The mirror is supported to be pivotable with respect to an axis of the mirror so as to allow the beams of light to scan a field of view of the LIDAR system. The LIDAR system further comprises a driver configured to drive the mirror into oscillations and a controller. The controller is configured to control at least one laser so as to selectively change a size of the field of view and/or to control the driver so as to selectively change the size of the field of view.

24 Claims, 12 Drawing Sheets

(56) References Cited

U.S. PATENT DOCUMENTS

| | | | |
|---|---|---|---|
| 2019/0094345 A1 | 3/2019 | Singer et al. | |
| 2020/0278427 A1* | 9/2020 | Chen | G01S 7/4972 |
| 2020/0379090 A1* | 12/2020 | Nothern, III | G01S 7/4815 |

FOREIGN PATENT DOCUMENTS

| | | |
|---|---|---|
| CN | 107646192 A | 1/2018 |
| CN | 107924115 A | 4/2018 |
| CN | 109581360 A | 4/2019 |
| CN | 109682819 A | 4/2019 |
| CN | 208705471 U | 4/2019 |
| WO | 2018126248 A1 | 7/2018 |

* cited by examiner

200

Controlling at least one laser so as to selectively change a size of a field of view of a LIDAR system, the LIDAR system comprising at least two lasers configured to emit aligned beams of light, a mirror configured to deflect the beams of light emitted by the lasers, the mirror supported to be pivotable with respect to an axis of the mirror so as to allow the beams of light to scan a field of view of the LIDAR system, and a drive configured to drive the mirror into oscillations, and/or ~210

Controlling the drive so as to selectively change the size of the field of view ~220

Fig. 2

LIDAR SYSTEM SELECTIVELY CHANGING A SIZE OF THE FIELD OF VIEW

FIELD

The present application relates to light detection and ranging (LIDAR) applications. More specifically, it relates to a LIDAR system having lasers for emitting beams of light, a mirror for deflecting the beams of light to scan a field of view of the LIDAR system, a drive configured to drive the mirror into oscillations and a controller configured to control the lasers and the drive.

BACKGROUND

A LIDAR system illuminates objects in a target area with laser light and measure the reflected light with a sensor. One of parameters of a LIDAR system is the range (D) at which objects in the target area of the LIDAR system may be detected. The range of a LIDAR system depends among others on a signal to noise ratio (SNR) of the reflected light. For example, for small objects at a long range, the relationship $SNR \sim 1/D^4$ generally holds. The SNR depends, in turn, among others on a field of view (FoV) of the LIDAR system. Generally, increasing the field of view reduces the SNR. For example, a receiver with a large FoV collects more ambient light, which results in more noise. In addition, a transmitter with a large FoV generally dilutes laser power which results in less signal. As a result, the design of a LIDAR system typically involves considerations with regard to balancing the range (D) and the field of view (FoV).

SUMMARY

It is desirable to have a flexible approach for changing a field of view of a LIDAR system.

Examples of the disclosure provide a light detection and ranging (LIDAR) system. The LIDAR system comprises at least two lasers configured to emit aligned beams of light and a mirror configured to deflect the beams of light emitted by the lasers. The mirror is supported to be pivotable with respect to an axis of the mirror so as to allow the beams of light to scan a field of view of the LIDAR system. The LIDAR system further comprises a drive configured to drive the mirror into oscillations and a controller. The controller is configured to control at least one laser so as to selectively change a size of the field of view and/or to control the drive so as to selectively change the size of the field of view.

Examples of the disclosure provide a method of operating a light detection and ranging (LIDAR) system. The LIDAR system comprises at least two lasers configured to emit aligned beams of light and a mirror configured to deflect the beams of light emitted by the lasers. The mirror is supported to be pivotable with respect to an axis of the mirror so as to allow the beams of light to scan a field of view of the LIDAR system. The LIDAR system further comprises a drive configured to drive the mirror into oscillations. The method comprises the step of controlling at least one laser so as to selectively change a size of the field of view and/or to control the drive so as to selectively change the size of the field of view.

By controlling at least one of the at least two lasers of the LIDAR system, for example, selectively selecting (or deselecting) for scanning the at least one laser, a dynamic change of the field of view of the LIDAR system may be advantageously achieved. The dynamic change may be achieved, for example, in a direction which corresponds to the direction of alignment of the laser beams, e.g. in a vertical direction. Also, by selectively selecting (or deselecting) for scanning the at least one laser only when the oscillating mirror assumes certain angular positions out of the totality of possible angular positions, a dynamic change of the field of view may be advantageously achieved, for example, in a direction which corresponds to the direction of the oscillations of the mirror, e.g., in a horizontal direction.

By controlling the drive, for example, by adjusting the amplitude of the oscillations of the mirror, a dynamic change of the field of view of the LIDAR system may be advantageously achieved. The dynamic change may be achieved, for example, in the direction which corresponds to the direction of the oscillations of the mirror, e.g., in the horizontal direction. Furthermore, by controlling both the at least one laser and the drive, a dynamic change of the field of view of the LIDAR system may be advantageously achieved, e.g., in both the vertical and horizontal direction.

In other words, examples of the disclosure allow to advantageously change the field of view of a LIDAR system during the operation of the LIDAR system in contrast to conventional approaches in which the field of view may be fixed at the design stage.

BRIEF DESCRIPTION OF THE DRAWINGS

Examples of the disclosure will subsequently be described by the enclosed figures, wherein

FIG. 2 shows a flow chart of a method for operating a LIDAR system, according to an example;

DETAILED DESCRIPTION

Figure 1:
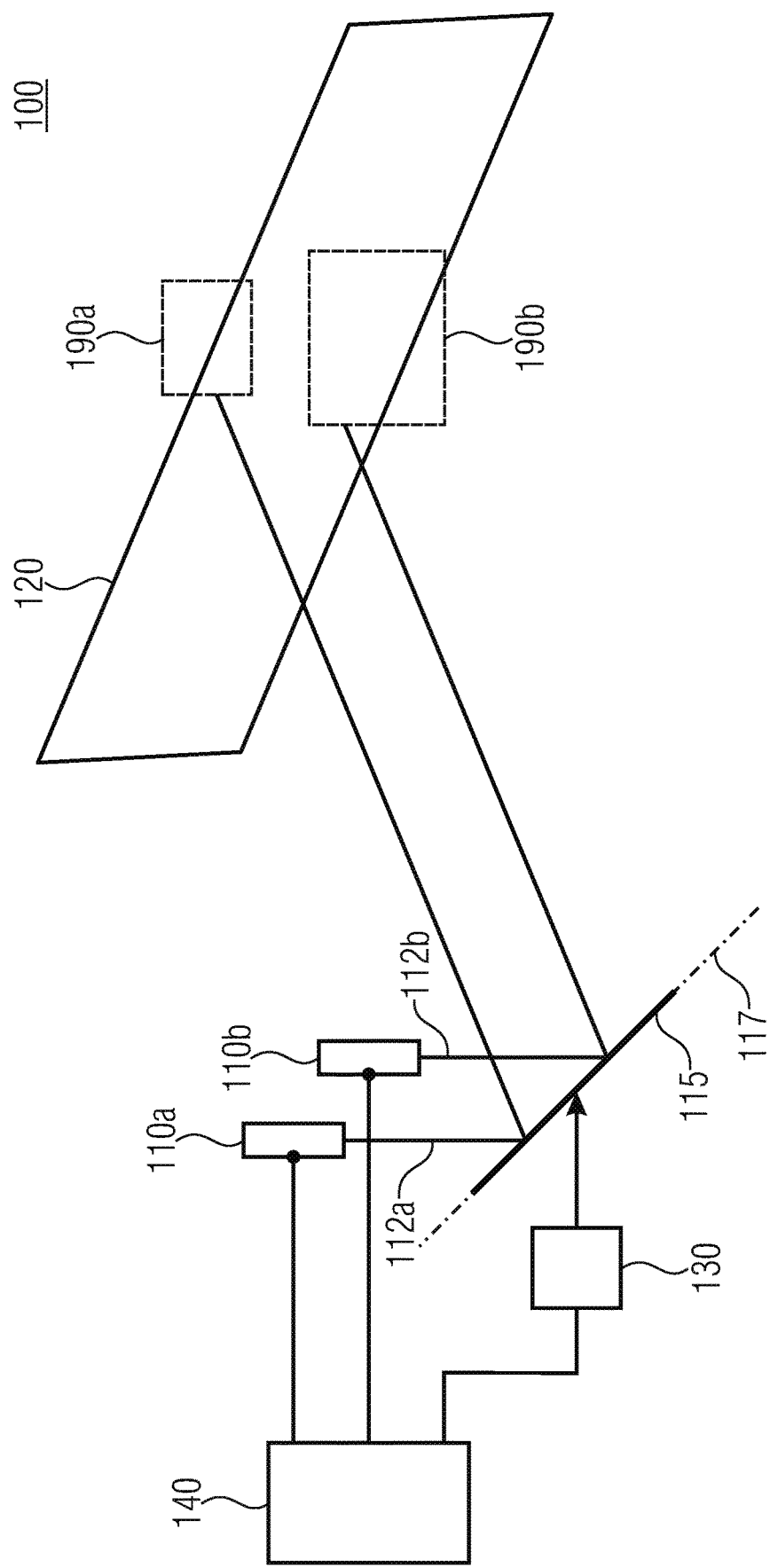
FIG. 1 shows a LIDAR system, according to an example.

FIG. 1 shows schematically a LIDAR system 100. The LIDAR system 100 comprises two lasers 110a, 110b which emit aligned beams of light 112a, 112b. The LIDAR system 100 comprises also a mirror 115 which deflects the beams of light 112a, 112b emitted by the lasers 110a, 110b. In an example, the beams of lights 112a, 112b are deflected by the mirror 115 towards objects 190a, 190b in the target area of the LIDAR system 100. The mirror 115 of the LIDAR system 100 is supported to be pivotable with respect to an axis 117 of the mirror 115. In this way, the beams of light 112a, 112b may scan a field of view 120 of the LIDAR system 100.

The LIDAR system 100 comprises further a driver 130 configured to drive the mirror 115 into oscillations. In addition, the LIDAR system 100 comprises a controller 140. The controller 140 controls at least one laser 110a, 110b so as to selectively change a size of the field of view 120. In an example, the controller 140 deselects at least one laser 110a or 110b for scanning. In another example, the controller deselects at least one laser 110a, 110b for scanning, e.g., for certain angular positions of the mirror 115. Alternatively, or in addition, the controller 140 controls the driver 130 so as to selectively change the size of the field of view 120. In an example, the controller adjusts an amplitude of the oscillations of the mirror 115.

According to an example of the disclosure, the controller may be configured to selectively change the size of the field of view for at least a duration of a scan of the field of view. This example may advantageously allow for a reduced or an enlarged field of view for one or more scans, e.g., one or more frames.

According to an example of the disclosure, the controller may be configured to selectively change the size of the field of view based on information obtained from one or more previous scans of the field of view, and/or based on information provided to the LIDAR system by an external controller of the LIDAR system and/or by a user of the LIDAR system. This example may advantageously allow for creating a region of interest in accordance of any previous knowledge about the objects in the target area of the LIDAR system. In an example, previous scans may be used to identify objects on which the laser pulses may be concentrated in order to improve range, detectability and/or confidence level. This example may also advantageously allow for creating a region of interest in dependence of the use of the LIDAR system. In an example, the size of the field of view may be adjusted, e.g., for a highway autopilot, in dependence on information provided by a navigation system or by the user.

According to an example of the disclosure, the lasers of the LIDAR system may comprise a first subset of one or more lasers and a second subset of one or more lasers. The controller may be further configured to select for scanning the lasers of the first subset and deselect for scanning the lasers of the second subset so as to reduce the size of the field of view in a first direction, e.g., a vertical direction. This example may advantageously allow for concentrating resources, such as laser pulses, on a region of interest.

According to an example of the disclosure, the controller may be configured to operate the lasers of the first subset at a pulse repetition frequency which is greater than a pulse repetition frequency in another mode of operation of the LIDAR system, in which the lasers of both the first subset and the second subset are selected for scanning. This example may advantageously allow for operating the lasers selected for scanning at a higher SNR.

According to an example of the disclosure, the controller may be configured to select for scanning at least one laser when a value representing the angular position of the oscillating mirror is within a first range of values and deselect for scanning the at least one laser when the value representing the angular position of the oscillating mirror is within a second range of values so as to reduce the size of the field of view in a second direction, e.g., a horizontal direction. This example may advantageously allow for arbitrary distribution of laser pulses and instantaneously switching of regions of interest.

According to an example of the disclosure, the controller may be configured to, when the value representing the angular position of the oscillating mirror is within the first range of values, operate the at least one laser at a pulse repetition frequency, which is greater than a pulse repetition frequency in another mode of operation of the LIDAR system, in which the at least one laser is selected for scanning when the value representing the angular position of the oscillating mirror is within the first range of values or the second range of values. This example may advantageously allow for scanning at a higher SNR.

According to an example of the disclosure, the controller may configured to adjust an amplitude of the oscillations of the mirror to correspond to an amplitude reference value so as to reduce the size of the field of view in a second direction, e.g., a horizontal direction. This example may advantageously allow for a higher concentration of pulses on the target.

According to an example of the disclosure, the controller may be configured to limit a rate of change of the amplitude reference value such that the rate of change is below a predetermined value. This example may advantageously allow for slowly changing a set-point of the amplitude control loop, e.g., in small increments, such that the mirror may stay operational and the LIDAR system may continue operating without interruption during the adjustment of the amplitude of the oscillations of the mirror.

According to an example of the disclosure, the controller may be configured to, in response to determining a change in the amplitude reference value, deselect for scanning at least one laser of the LIDAR system for a predetermined period of time. This example may advantageously allow for a simple implementation since during the adjustment of the amplitude of the oscillations of the mirror one or more lasers are not are not operated.

According to an example of the disclosure, the controller may be configured to, in response to determining a change in the amplitude reference value, replace one or more parameters of a regulator used to adjust an amplitude of the oscillations of the mirror with temporary parameters for a predetermined period of time. This example may advantageously allow for using regular parameters to suppress, e.g., jitter caused by external vibrations, and using temporary parameters to achieve a fast switching of the amplitude of the oscillations of the mirror.

According to an example of the disclosure, the controller may be configured to, in response to determining a change in the amplitude reference value, replace structure of a regulator used to adjust an amplitude of the oscillations of the mirror with a temporary structure for a predetermined period of time. This example may advantageously allow for using a regular structure of the regulator, e.g., a PID regulator, to suppress the jitter and using a temporary structure, e.g., a PI regulator, or a feed-forward structure, or the like, to achieve a fast switching of the amplitude of the oscillations of the mirror.

According to an example of the disclosure, the regulator may comprise at least one integral component, and the controller may be configured to, in response to determining a change in the amplitude reference value, disable the regulator, then set a predetermined value as an output of the integral component of the regulator, and then enable the regulator. This example may advantageously allow for expediting the otherwise relatively time consuming integral action of the regulator in order to achieve a fast switching of the amplitude of the oscillations of the mirror.

According to an example of the disclosure, the predetermined value may be a value expected to be assumed when the amplitude of the oscillations of the mirror corresponds to the amplitude reference value. This example may advantageously allow for achieving a fast switching of the amplitude of the oscillations of the mirror.

According to an example of the disclosure, the drive may be an electrostatic drive to which a voltage is alternately switched to drive the mirror into oscillations, and the controller may be configured to, in response to determining a change in the amplitude reference value, if the change in the amplitude reference value is negative, invert the voltage being alternately switched to the electrostatic drive for a predetermined period of time. The inversion of the voltage can be understood as "toggling", i.e. on becomes off, and off becomes on. In other words, the voltage is, for example, applied periodically (see, for example, the voltage 507 switched to the electrostatic drive, as described later with respect to FIG. 5). According to an embodiment a time offset of $\Delta t$ between a zero crossing of the oscillation and a stopping of the voltage can be realized. This temporal offset can be used to actively damp a vibration to control the amplitude. In the period between the zero crossing of the oscillation and the switching off of the voltage, for example, active damping of the oscillation takes place, since electrostatic forces caused by the applied voltage counteract the oscillation. In other words, the voltage can be turned off after the zero crossing with a variable delay $\Delta t$ and the voltage is then, for example, switched on again when the mirror is in its fully deflected position. This example may advantageously allow for achieving a fast reduction of the amplitude of the oscillations of the mirror by extracting energy from the oscillating mirror by inverted actuation of the oscillating mirror.

According to an example of the disclosure, the drive may be an electrostatic drive to which a voltage is alternately switched to drive the mirror into oscillations, and the controller may be configured to, in response to determining a change in the amplitude reference value, if the change in the amplitude reference value is positive, control the drive for a predetermined period of time such that a phase between the voltage applied to the electrostatic drive and an oscillating motion of the mirror (e.g. a MEMS mirror) (e.g. the oscillating motion of two or more MEMS mirrors). Alternatively the controller may be configured to, in response to determining a change in the amplitude reference value, if the change in the amplitude reference value is positive, control the drive for a predetermined period of time such that a phase between the voltage applied to the electrostatic drive and a current through the electrostatic drive is lower than a predetermined value. This example may advantageously allow for achieving a fast increase of the amplitude of the oscillations of the mirror by efficiently supplying energy to the oscillating mirror, e.g., at a zero phase or similar.

According to an example of the disclosure, the drive may be an electrostatic drive to which a voltage is alternately switched to drive the mirror into oscillations, and the controller may be configured to, in response to determining a change in the amplitude reference value, adjust the amplitude of the voltage applied to the electrostatic drive for a predetermined period of time such that the amplitude of the voltage is increased if the change in the amplitude of the reference value is positive and the amplitude of the voltage is decreased if the change in the amplitude of the reference value is negative. This example may advantageously allow for achieving a fast switching of the amplitude of the oscillations of the mirror by adapting the actuating voltage to the amplitude of the oscillations of the mirror.

According to an example of the disclosure, the drive may be an electrostatic drive to which a voltage is alternately switched to drive the mirror into oscillations, and the controller may be configured to, in response to determining a change in the amplitude reference value, set a switch-off time of the voltage to a predetermined value in dependence on the amplitude reference value. This example may advantageously allow for achieving a fast switching of the amplitude of the oscillations of the mirror by adjusting the period of time during which energy is provided to (or extracted from) the oscillating mirror.

According to an example of the disclosure, the controller may be configured to selectively deactivate one or more elements of a receiving chain which correspond to the lasers which are deselected for scanning. This example may advantageously allow for reducing the power consumption of the LIDAR system.

FIG. 2 shows a flow chart of a method 200 of operating a LIDAR system. The LIDAR system comprises at least two lasers configured to emit aligned beams of light and a mirror configured to deflect the beams of light emitted by the lasers. The mirror is supported to be pivotable with respect to an axis of the mirror so as to allow the beams of light to scan a field of view of the LIDAR system. The LIDAR system further comprises a drive configured to drive the mirror into oscillations. The LIDAR system described in conjunction with the method 200 may be any of the LIDAR systems in accordance with examples of the present disclosure.

The method 200 comprises the step 210 of controlling at least one laser so as to selectively change a size of the field of view. Alternatively, or in addition, the method 200 comprises the step 220 of controlling the drive so as to selectively change the size of the field of view.

The method 200 may optionally be supplemented by any of the features, functionalities and details disclosed herein, also with respect to the apparatuses. The method 200 may optionally be supplemented by such features, functionalities and details both individually and taken in combination.

Figure 3:
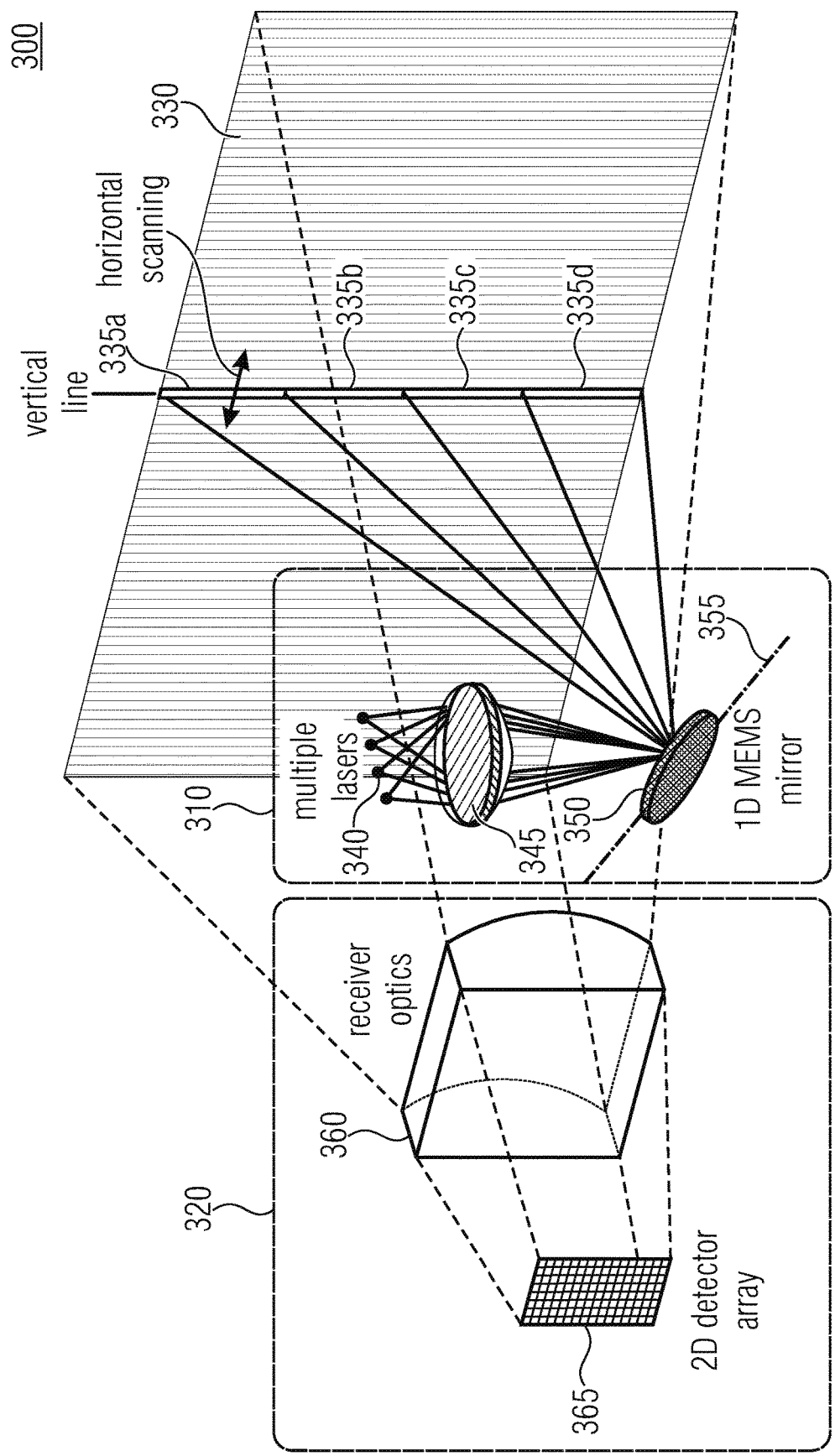
FIG. 3 shows an exemplary 1D scanning LIDAR system, according to an example.

FIG. 3 shows an exemplary 1D scanning LIDAR system 300. The system 300 comprises a transmitter 310 and a receiver 320. The transmitter 310 illuminates a portion of the scenery 330, which may be referred to as a field of view (FoV) of the LIDAR system 300. A laser beam emitted by the transmitter 310 is reflected by objects in the scenery 330 and obtained at the receiver 320 to obtain a digital representation of the scenery 330.

The transmitter 310 comprises a plurality of linear arrays 340 of lasers mounted together, e.g., 4 arrays 340 (e.g. edge emitting lasers, or laser lines, or lasers of which the output beam is line-shaped). The individual beams of the lasers 340 are focused by a lens system 345 and deflected by a 1D MEMS mirror 350. The transmitter is controlled by a controller (not shown) which effectuates the 1D MEMS mirror 350 to oscillate and assume different angular positions with regard to the axis 355 such that the scenery 330 is scanned (e.g., horizontally). The oscillations of the mirror 350 may be effectuated by an electrostatic drive (not shown) connected to the mirror 350 and controlled by the controller. In an example, the controller may be further connected to and controlled by an external controller, e.g., a supervisory controller of a vehicle, a navigation system, or by a user interface. The lasers 340 are controlled by the controller such that pulsed laser beams 335*a*, 335*b*, 335*c*, 335*d* illuminate the scenery 330. According to an example, an individual pulse of the lasers may have the duration in the order of a few nanoseconds, e.g., 10 ns.

The receiver 320 comprises optics 360 and a 2D detector array 365. The optics 360 focuses the light reflected from the scenery 330 on the 2D detector array 365. The 2D detector array 365 is connected to a processing module (not shown). The processing module obtains the electrical signals provided by the 2D detector array 365 and uses analog and digital signal and data processing in order to provide a digital representation of the scenery 330. For an individual angular position of the mirror 350, a laser pulse is emitted by the lasers 340 and the electrical signals provided by the 2D detector array 365 are captured and sampled for a predetermined period of time in order to obtain light reflected by the objects in the target area. According to an example, the capture time may have the duration in the order to a few microseconds, e.g., 2 µs.

Figure 4:
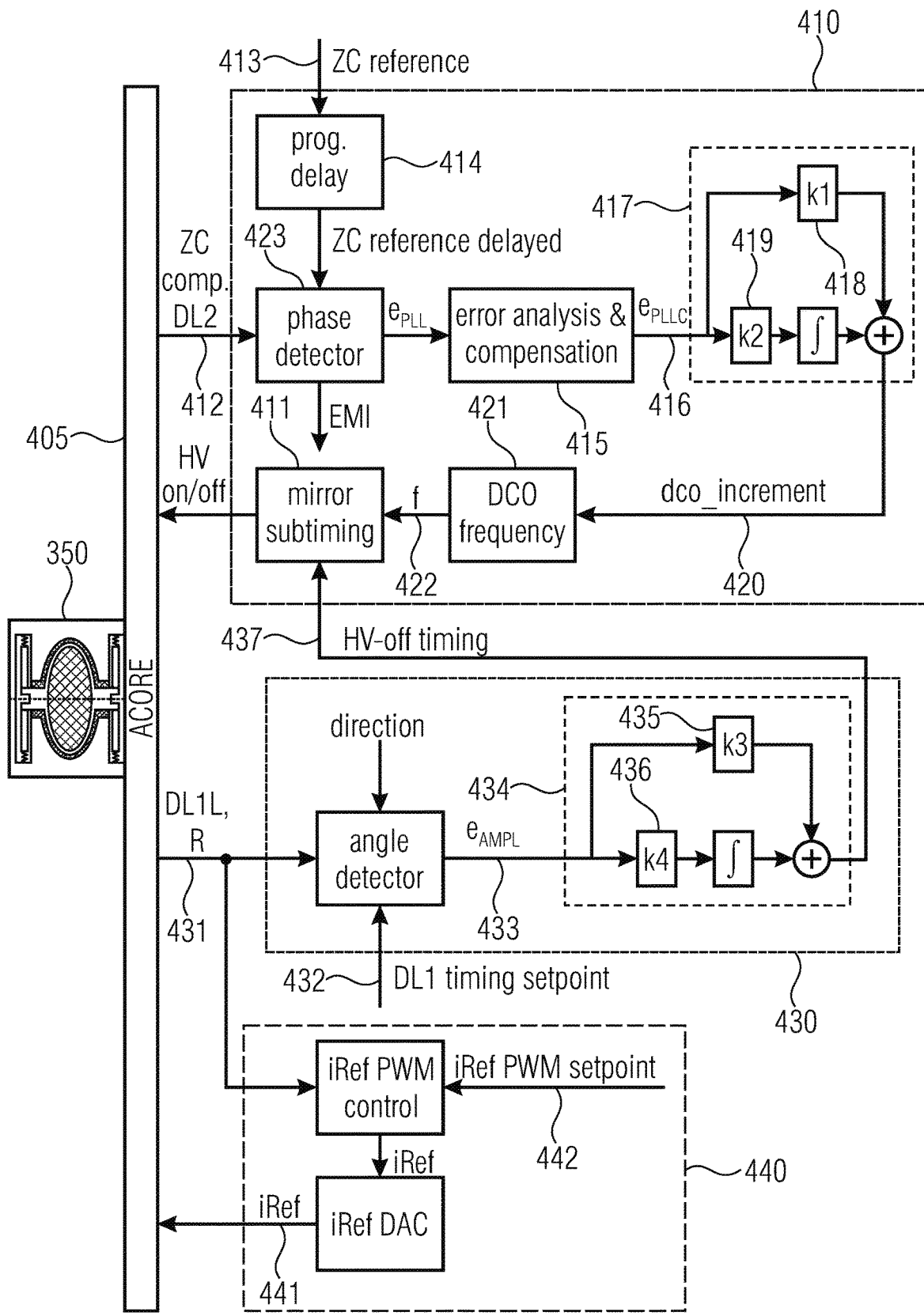
FIG. 4 shows a block diagram of an exemplary implementation of a driver and an associated controller of the mirror, according to an example.

FIG. 4 shows a block diagram of an exemplary implementation of a driver 405 and an associated controller of the mirror 350 described in conjunction with FIG. 3. It is noted that those elements already described above have associated the same reference signs and are not described again.

The function of the driver and controller, e.g., a MEMS Driver ASIC, is to actuate and control the MEMS mirror 350 and to signal its position to the System ASIC (not shown) in order to enable an accurate laser shooting, e.g., of the lasers 340. In order to achieve this, the MEMS Driver ASIC comprises three control loops in its digital domain: a PLL control loop 410, an amplitude control loop 430, and an iRef control loop 440.

The PLL loop 410 locks the MEMS Driver's internal subtiming counter 411 to the movement of the mirror 350. The PLL 410 control uses a zero crossing (ZC) device layer 2 (DL2) comparator signal 412 and compares it with a ZC reference signal 413 (which is generated by the Mirror Subtiming block, not shown) which is delayed in a delay element 414 in order to compensate the analog delays. The error signal $e_{PLL}$ is then analyzed and periodic error signals (caused by chopping and mirror asymmetry) may be compensated in a compensation element 415.

The error value $e_{PLLC}$ 416 is fed into a PI loop filter 417 employing gain values k1 418 and k2 419 that are selected by taking into account noise amplification via k1 and oscillations introduced by high k2, etc. k1 and k2 form a dco_increment value 420. A digitally controlled oscillator (DCO) 421 derives its output frequency based on the dco_increment value 420. Based on the DCO frequency 422, the mirror subtiming counter 411 is driven. The mirror subtiming counter 411 divides the mirror's half period into phase slices and acts as the central scheduler for substantially all MEMS Driver activities (e.g., when to switch on/off HV, when to track/reset the peak detectors, when the digitize the analog DL1&2 values). In other words, the phase detection 423 of the PLL 410 generates an error signal that causes the subtiming counter 411 being counted with a varying frequency.

The iRef loop 440 controls the iRef level 441 in such a way that the time period the comparator is triggered is essentially always the same. In other words, the set-point 442 of the iRef control loop 440 defines the comparator-trigger-period.

Figure 5:
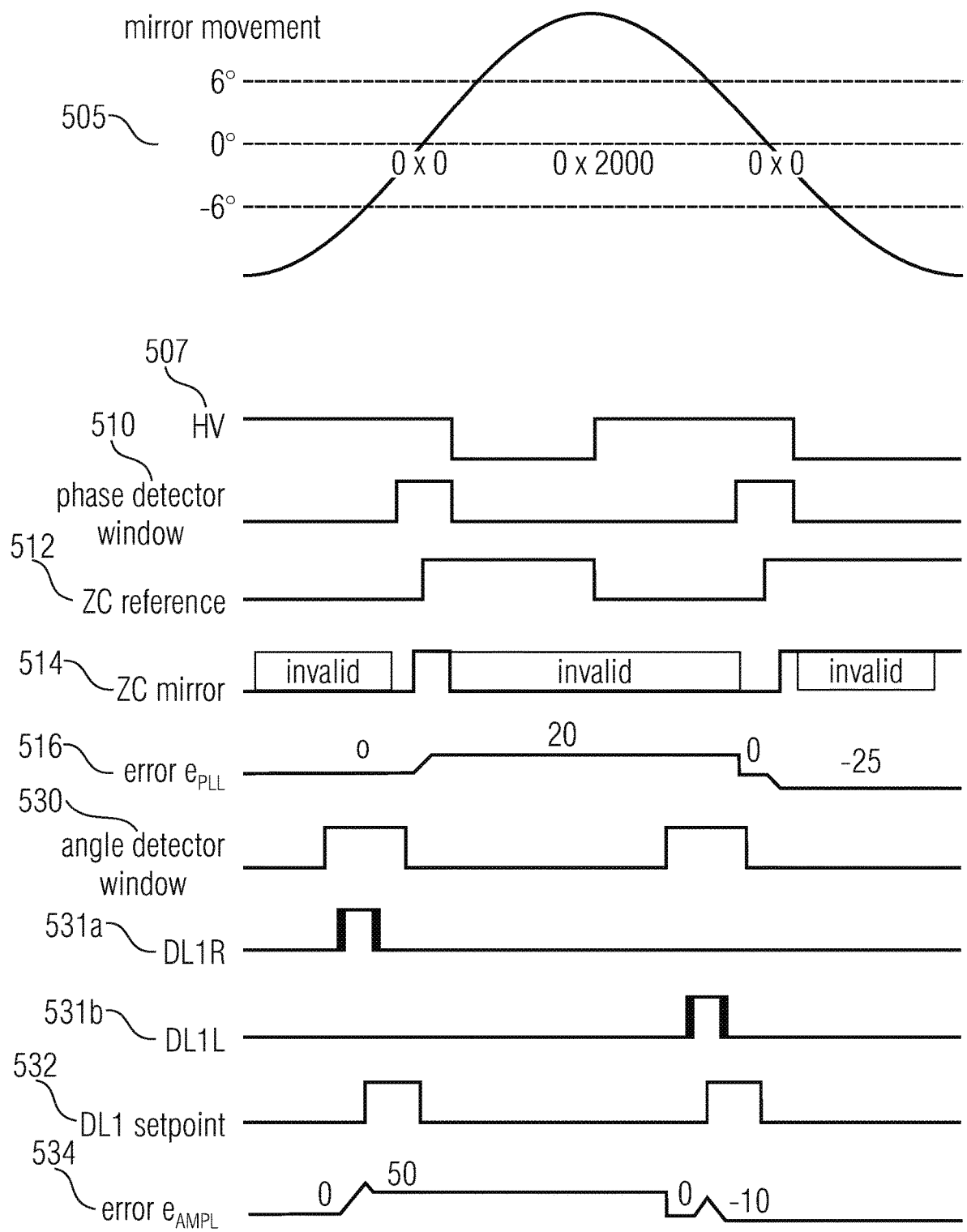
FIG. 5 shows exemplary time waveforms associated with the driver and controller, according to an example.

FIG. 5 shows exemplary time waveforms associated with the driver and controller described in conjunction with FIG. 4 above. More specifically, FIG. 5 shows waveforms associated with implementations of the PLL control 410 and the amplitude control 430. The waveform 505 corresponds to the movement of the mirror, whereas the waveform 507 illustrates the voltage switched to the electrostatic drive. Both implementations define detector windows 510, 530 and set-points 512, 532 which are given in phase counter values. Only in these detector windows the PLL and amplitude controls are active. If the zero crossing reference 512 lags behind the actual measured zero crossing 514 (DL2 comparator triggered and reference signal low), then the PLL error 516 value is incremented. In the opposite case (DL2 comparator triggered and reference signal high), the PLL error 516 is decremented. The final error value is then employed in the subsequent blocks (error analysis & compensation, gain & integrator, etc.).

In order to detect whether the ASIC is affected by electromagnetic interferences, an EMI monitoring feature is implemented. The EMI monitoring is defined as follows: DL2 comparator (because noise impacts the analog DL2 circuits more than the DL1 circuits) is evaluated while the phase detector window is active according to the signal 510. Instead of incrementing and decrementing an error value (as it is done by the PLL error in the PLL control loop 410), the EMI value is incremented for both incrementing and decrementing events. The EMI measure is then evaluated in an angle OK checker (not shown) whether a certain threshold is exceeded.

Figure 6:
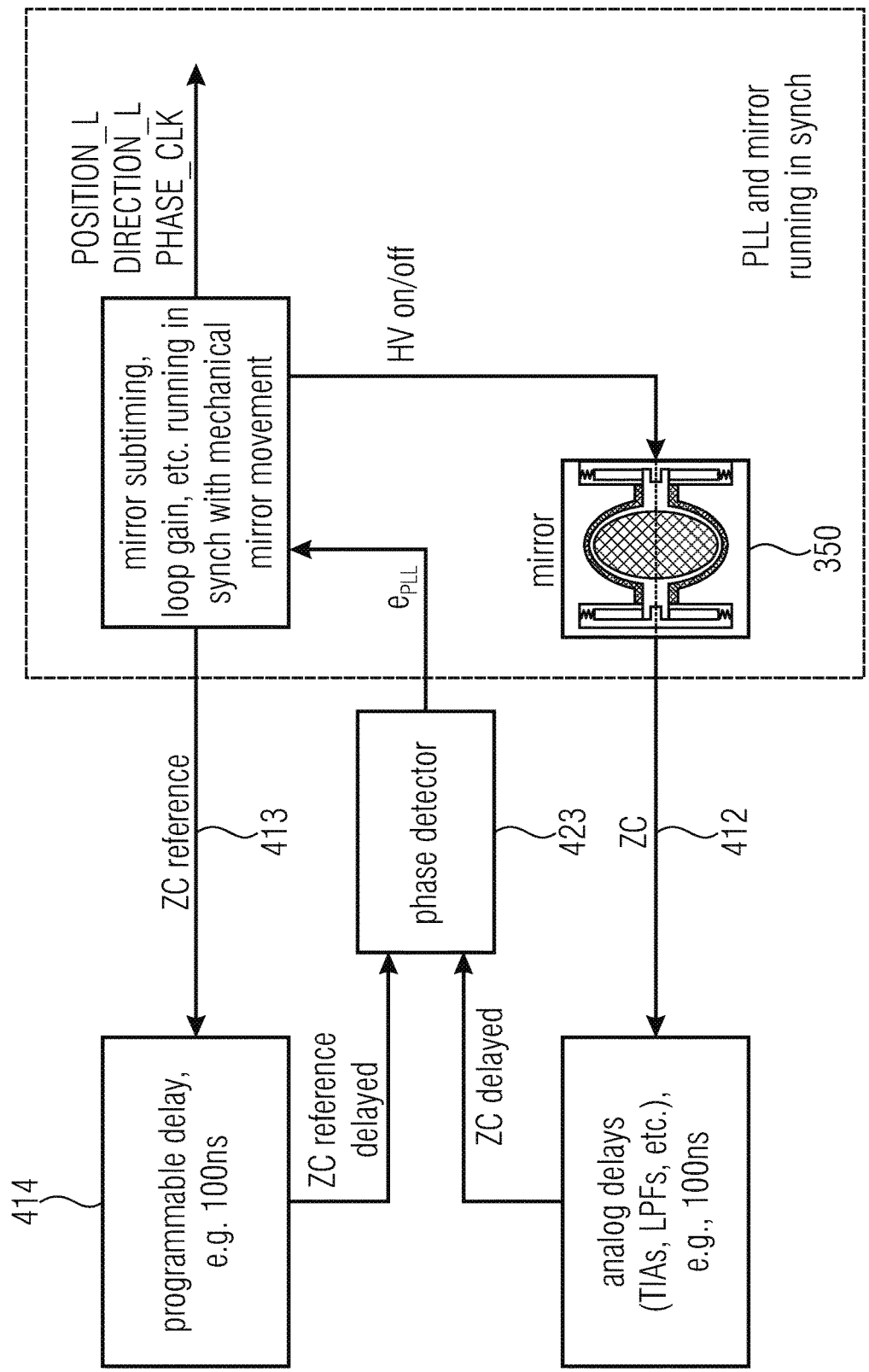
FIG. 6 shows a block diagram illustrating PLL and mirror in synchronism, according to an example.

FIG. 6 shows a block diagram illustrating PLL and mirror in synchronism in accordance with the exemplary driver and controller described in conjunction with FIG. 4 above. As above, those elements already described above have associated the same reference signs and are not described again.

As described above, the driver's mirror PLL 410 is designed in order to run in synch with the mechanical movement of the mirror 350. While the PLL's core element (the mirror subtiming counter 411), is running in synch with the mechanical movement of the mirror 350, the reference zero-crossing signal 413 is delayed as much as the analog delay of the driver (TIA delay, low-pass filters, etc.).

Figure 7:
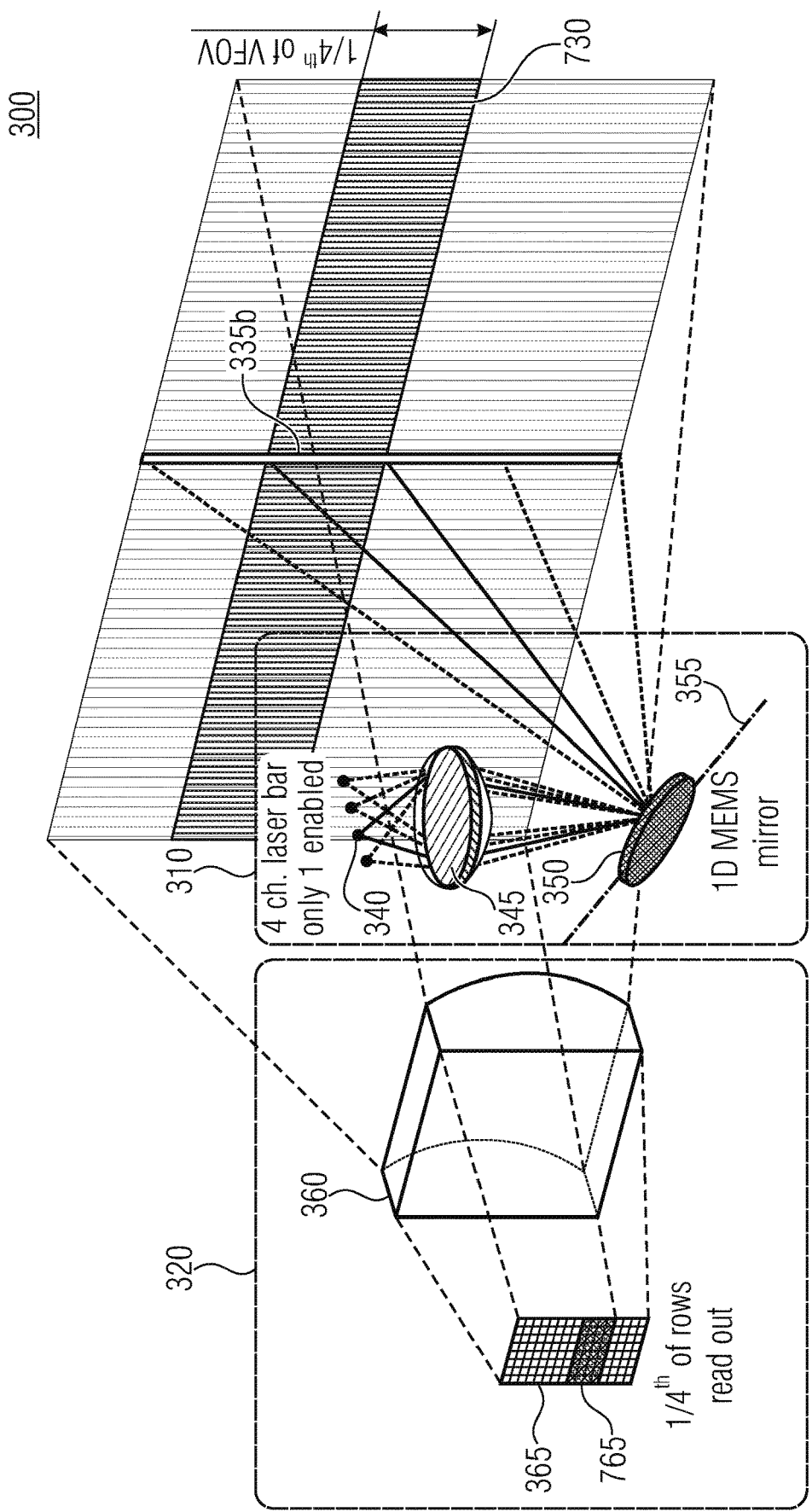
FIG. 7 shows a LIDAR system with a reduced vertical field of view, according to an example.

FIG. 7 shows an example of the LIDAR system described in conjunction with FIG. 3 above. The LIDAR system shown in FIG. 7 has a reduced vertical field of view. Those elements already described above have associated the same reference signs and are not described again.

According to the example of FIG. 7, only one laser channel (i.e., only one of the four lasers 340) is repeatedly fired. In other words, only one laser of the lasers 340 is selected for scanning (enabled), whereas the remaining three lasers of the lasers 340 are deselected for scanning (disabled). As a result, only the laser beam 335b scans the scenery. The size of the field of view 730 is reduced to ¼th in the vertical direction. Also, only ¼th of the rows of the detector array 365, more specifically, the rows 765 which corresponds to the laser beam 335b, are read out and used in further processing to obtain a digital representation of the scenery. Some segments, e.g., of the detector array and associated signal processing may be disabled (e.g. by turning off the TIAs or the like).

In an example, the one laser selected for scanning may be operated at a pulse repetition frequency (PRF) of 400 kHz. It noted that in case all four lasers 340 are operated, the PRF may equal to 100 kHz for each of the lasers 340. The increase in the PRF by the factor of 4 allows for 4 times more averaging of the received reflected pulses and leads to an improvement in the SNR by the factor of 2. The total laser power of the die/package/drive does not increase. The duty cycle does not change for the laser die, e.g., in terms of the 0.1% limit.

Figure 8:
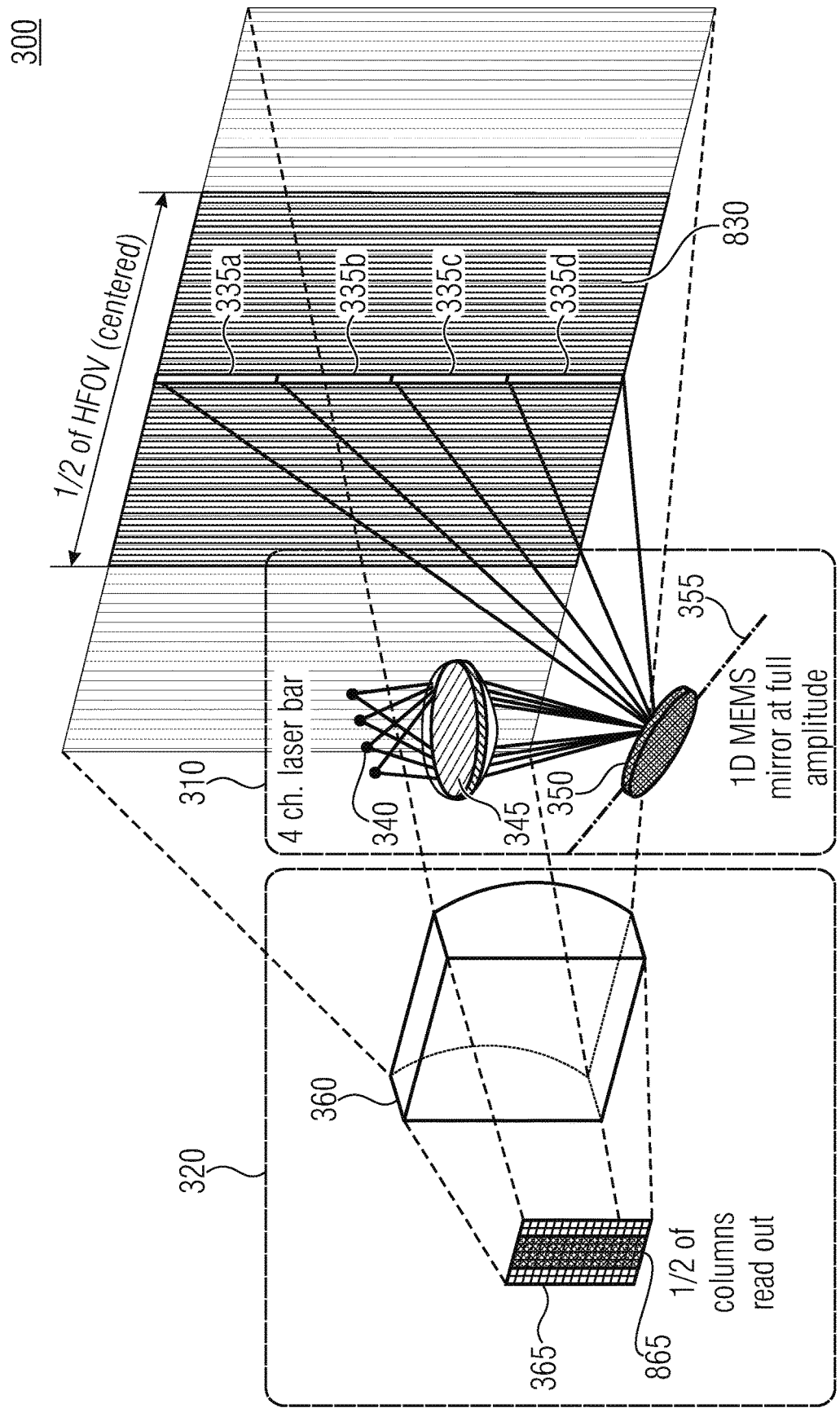
FIG. 8 shows a LIDAR system with a reduced horizontal field of view, according to an example.

FIG. 8 shows an example of the LIDAR system described in conjunction with FIG. 3 above. The LIDAR system shown in FIG. 8 has a reduced horizontal field of view. Those elements already described above have associated the same reference signs and are not described again.

According to the example of FIG. 8, the four lasers 340 are operated only in a part of the full horizontal FoV. In other words, only a part of the angular positions of the mirror 350 is selected for scanning, whereas the remaining angular positions of the mirror are deselected for scanning. The beams 335a, 335b, 335c, 335d scan the scenery, when the angular position of the mirror is in the range selected for scanning. In the example of FIG. 8, the size of the field of view 830 is reduced to ½ in the horizontal direction. The amplitude of the oscillations of the mirror 350 is the same as in the examples of FIG. 3 and FIG. 8. Also, only ½ of the detector array 365, more specifically, the columns 865 which corresponds to the reduced size of the field of view, are read out and used in further processing.

In other words, in the example of FIG. 8, the scan angle of the mirror 350 is kept constant (e.g., at the full amplitude) and the distribution of the pulses of the lasers 340 is changed. The thereby obtained region of interest (RoI) may be located anywhere in the full horizontal field of view, for example, at the left or right edge of the FoV, or in the middle of the FoV. The peak PRF may increase, for example, based on the size of the reduced FoV 830, e.g., proportional to the reduction in the FoV. The increase of the PRF is limited by the range unambiguity requirement which results from the capture time (e.g. it might be required to be greater than 2 µs). For the sake of thermal management and power consumption, a long time average PRF may be maintained. The example of FIG. 8 may advantageously allow for arbitrary horizontal distribution of the beams in the scenery and instantaneous switching of the RoIs.

Figure 9:
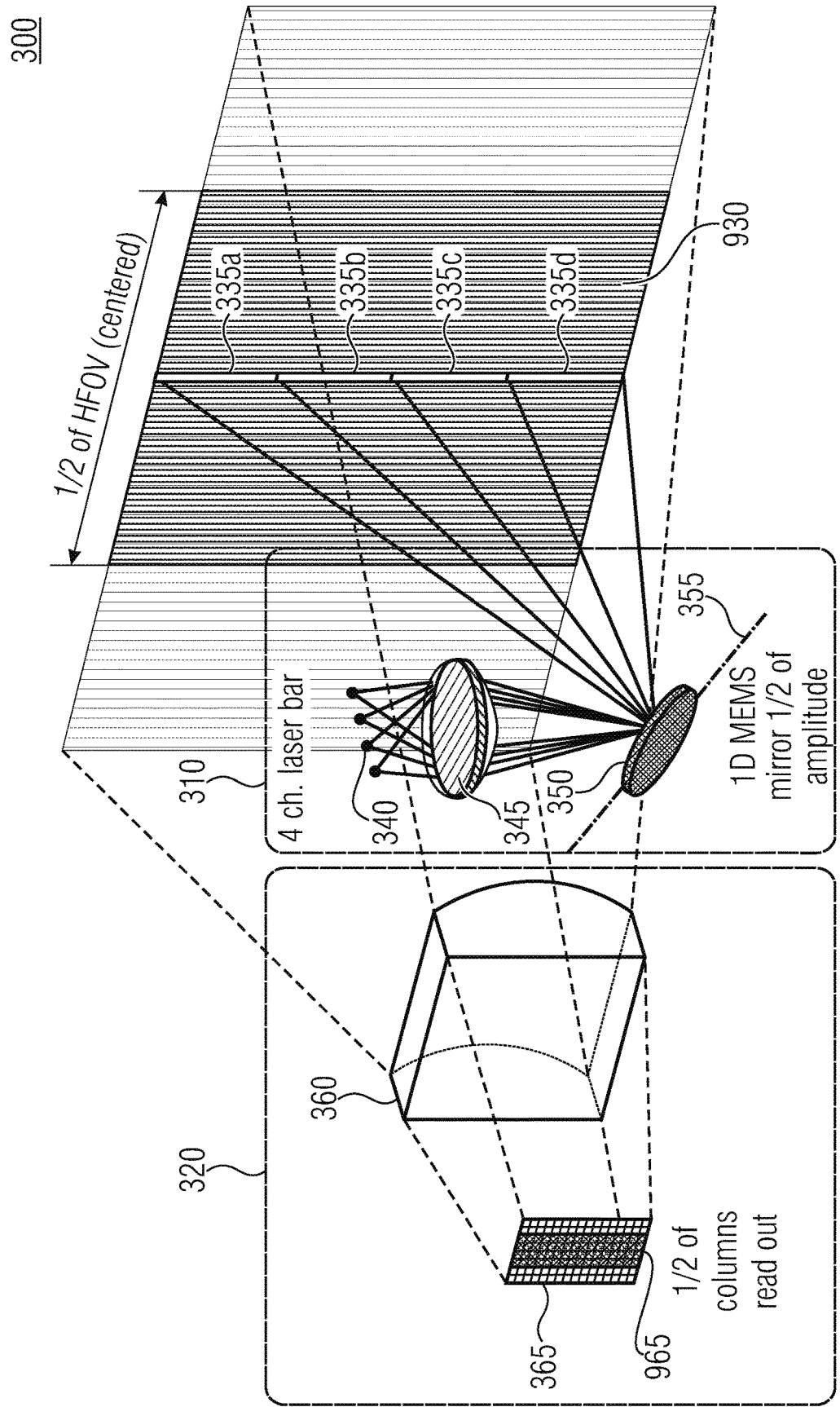
FIG. 9 shows a LIDAR system with a reduced horizontal field of view, according to an example.

FIG. 9 shows another example of the LIDAR system described in conjunction with FIG. 3 above. The LIDAR system shown in FIG. 9 has a reduced horizontal field of view. Those elements already described above have associated the same reference signs and are not described again.

According to the example of FIG. 9, the mirror 350 is operated at reduced amplitude (e.g., half amplitude) relative to the full amplitude of the oscillations of the mirror as described, for instance, in conjunction with FIG. 3 and FIG. 8 above. As a result, the pulses of the lasers 340 may be distributed uniformly but over a smaller angle range. The distribution of pulses may be centered, i.e. symmetric around the neutral position of the mirror 350. Alternatively, a bias may be applied such that the distribution of the pulses is not symmetric about the neutral position of the mirror 350. The beams 335a, 335b, 335c, 335d scan the scenery for any angular position of the mirror 350. The size of the field of view 930 is reduced in the horizontal direction (e.g., to equate to ½ of the full size horizontal field of view) due to the reduced amplitude of the oscillations of the mirror 350. A ½ of the detector array 365, more specifically, the columns 965 which corresponds to the reduced size of the field of view, are read out and used in further processing to obtain a digital representation of the scenery.

In other words, at reduced amplitude, the mirror 350 may move more slowly. As a result, more time may be available for firing the pulses of the lasers 340 and a higher concentration of the laser pulses may be achieved which results in more pulses emitted towards the target. In addition, a full scan of the mirror 350 may be used which maximizes resource utilization, e.g., a more constant PRF may be used. The reduced amplitude of the mirror may be suitable and advantageous for a highway autopilot.

It is noted that the examples described in conjunction with FIGS. 7, 8 and 9 may be combined. For example, the vertical reduction of the field of view described in conjunction with FIG. 7 may be combined a horizontal reduction of the field of view described in conjunction with FIG. 8 and FIG. 9.

Figure 10:
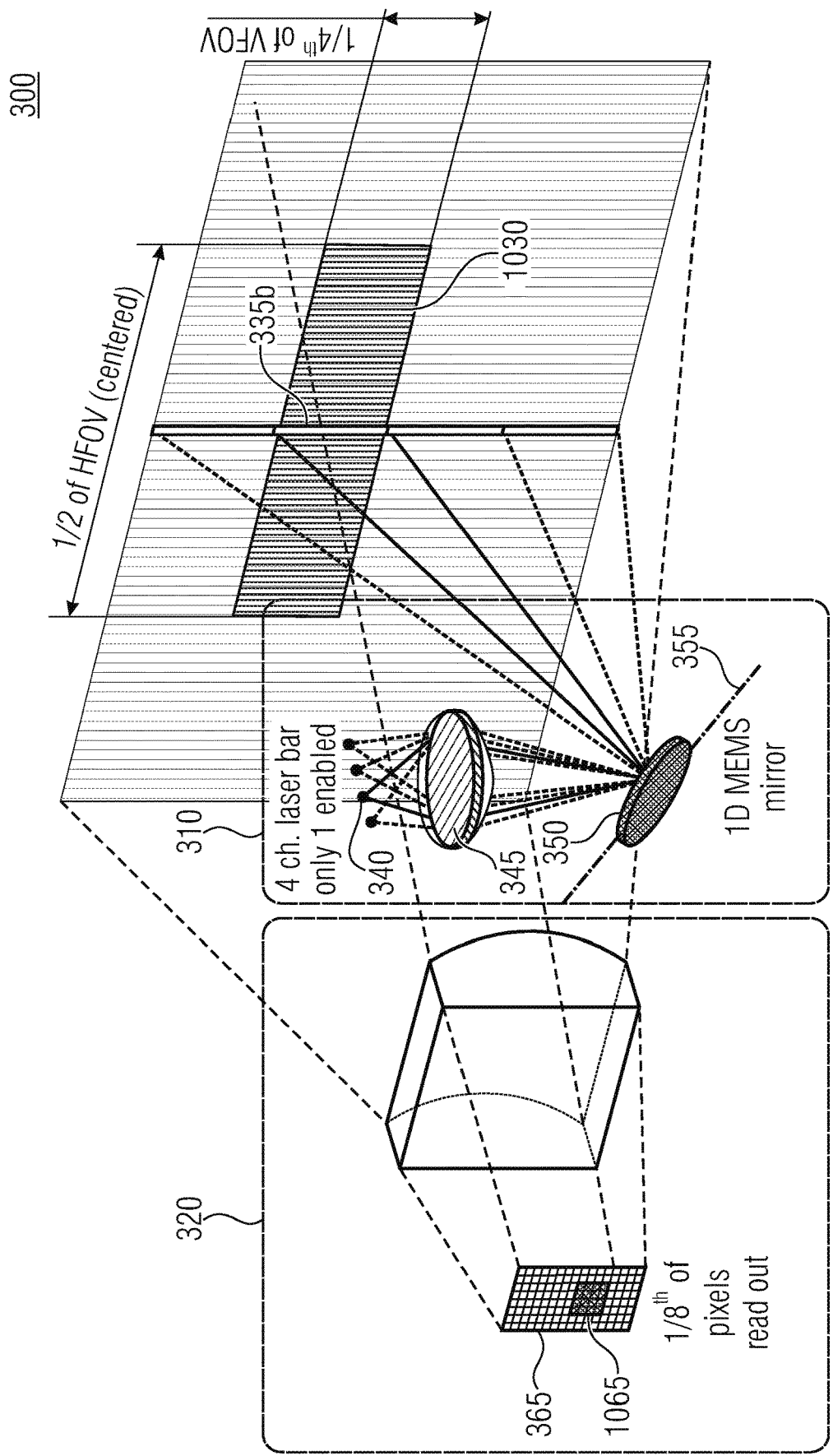
FIG. 10 shows a LIDAR system with a reduced vertical and horizontal field of view, according to an example.

FIG. 10 shows an example of the LIDAR system described in conjunction with FIG. 3 above. The LIDAR system shown in FIG. 10 has a reduced vertical and horizontal field of view. Those elements already described above have associated the same reference signs and are not described again.

According to the example of FIG. 10, only one laser channel (i.e., only one of the four lasers 340) is repeatedly fired. In other words, only one laser of the lasers 340 is selected for scanning (enabled), whereas the remaining three lasers of the lasers 340 are deselected for scanning (disabled). As a result, only the laser beam 335b scans the scenery. The laser selected for scanning is operated only in a part of the full horizontal FoV. In other words, only a part of the angular positions of the mirror 350 is selected for scanning, whereas the remaining angular positions of the mirror are deselected for scanning. Alternatively, the amplitude of the oscillation of the mirror 350 may be reduced.

The field of view 1030 shown in FIG. 10 is reduced relative to the full field of view of the LIDAR system 300. According to the example of FIG. 10, the vertical field of view is reduced to ¼ of the full vertical field of view and the horizontal field of view is reduced to ½ of the full horizontal field of view, which results in a size of the field of view 1030 being ⅛ of the size of the full field of view of the LIDAR system 300. Also, only ⅛ of the pixels of the detector array 365, namely the pixels 1065 corresponding to the laser beam 335b and the reduced scan angle of the mirror 350 are read out and used in further processing.

Figure 11A:
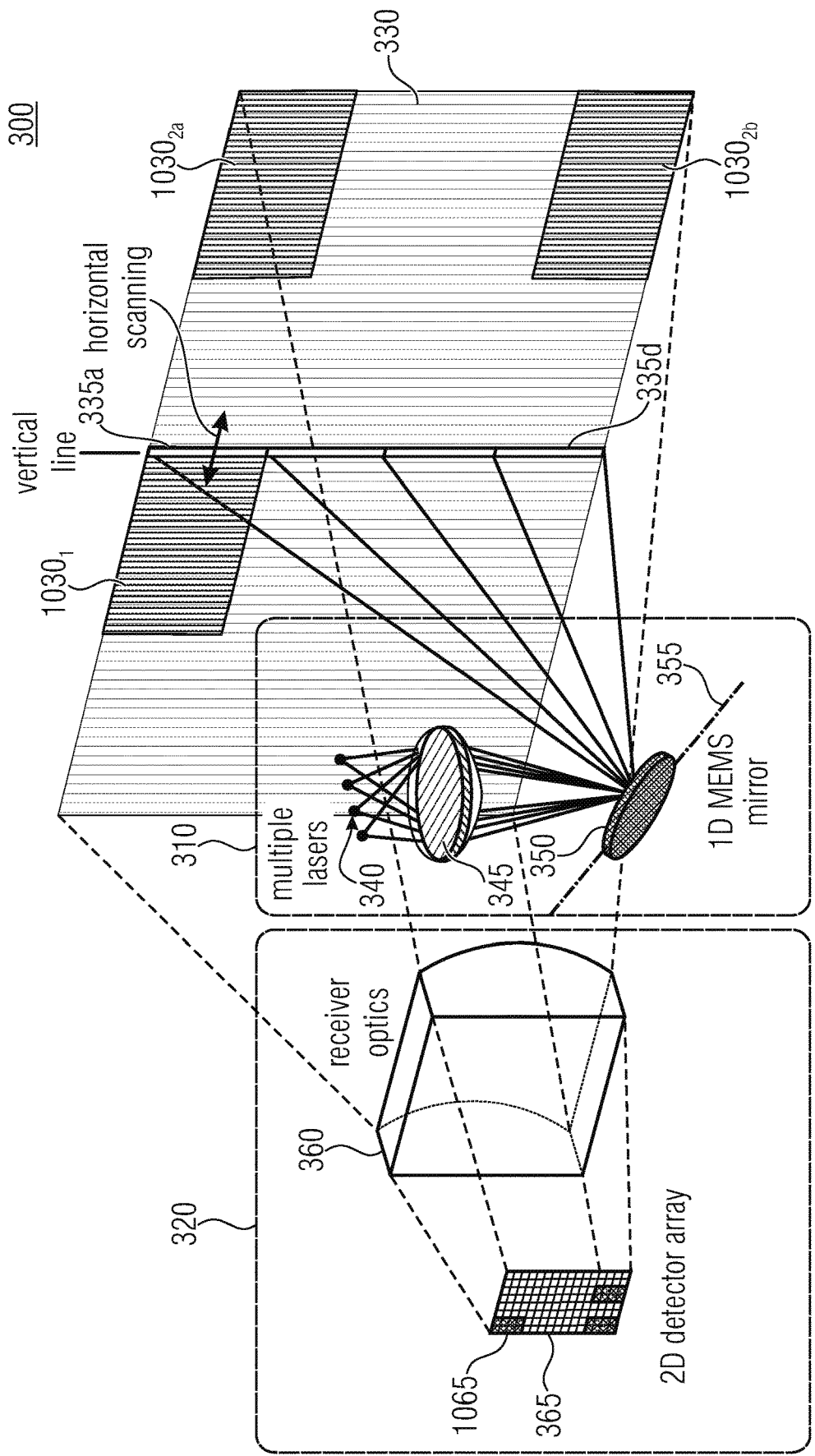
FIG. 11a shows a LIDAR system with spatially distributed reduced vertical and horizontal field of views, according to an example.
Figure 11B:
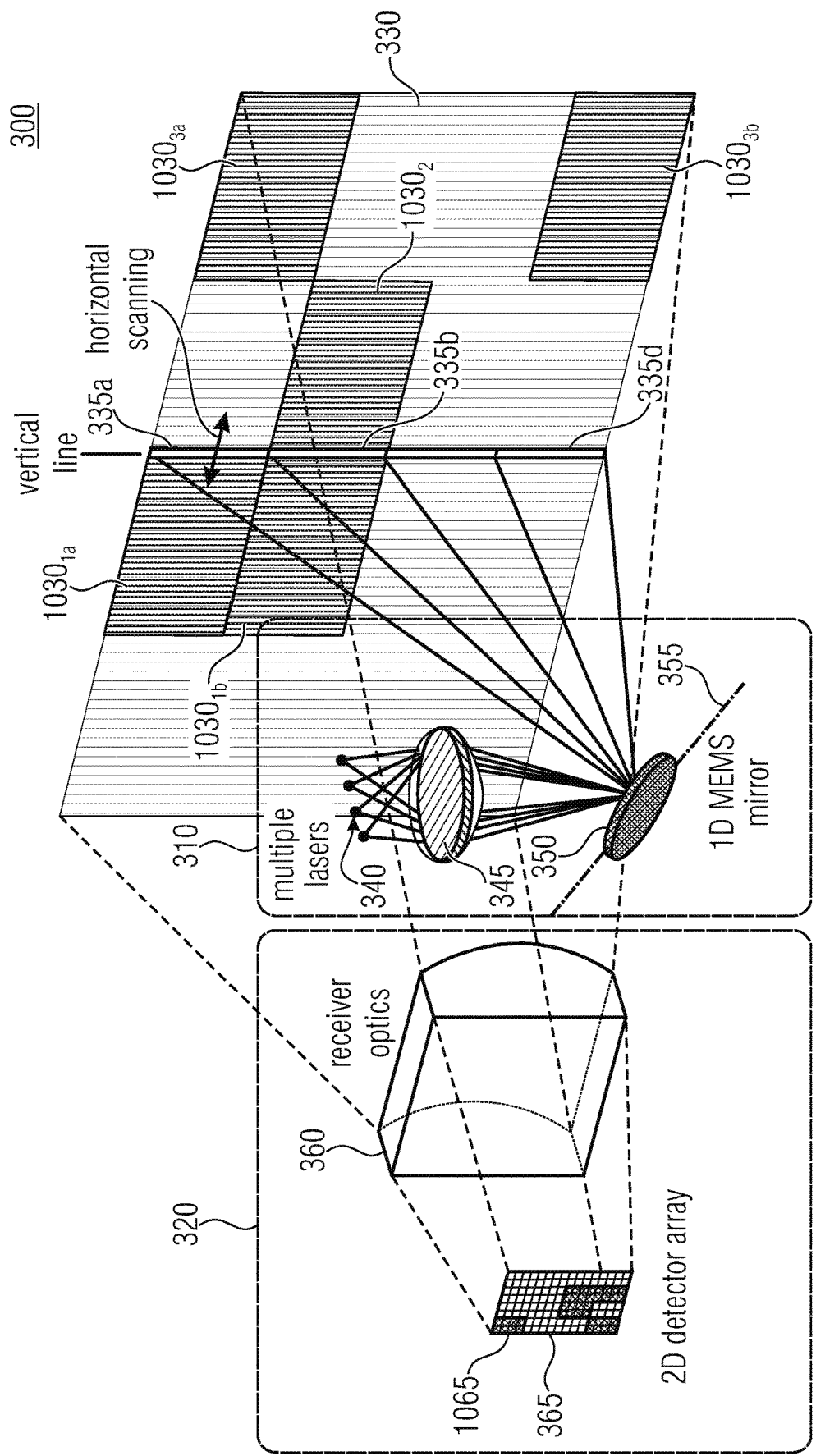
FIG. 11b shows a LIDAR system with dynamically changed field of views, according to an example.

FIG. 11a and FIG. 11b show example of the LIDAR system described in conjunction with FIG. 3 above. The LIDAR system shown in FIG. 11a or FIG. 11b has a spatially distributed reduced vertical and horizontal field of views. Those elements already described above have associated the same reference signs and are not described again.

According to an embodiment, the field of view 1030 is changed dynamically, for example, depending on a scanning angle of the mirror 350 in the horizontal direction (e.g. a first direction, perpendicular to a second direction (i.e. the vertical line)). The field of view can be adapted based on the room of interest, which may be created in accordance of any previous knowledge about the objects in a scenery 330 of the LIDAR system. According to an embodiment this information can be obtained (e.g. received or determined) by the LIDAR system 300. Thus, the field of view is reduced to the relevant areas in the scenery 330.

According to an embodiment, shown in FIG. 11a, different numbers of laser channels can be repeatedly fired depending on the defined reduced field of view. The reduced field of view 1030 is, for example, subdivided into different rooms of interest $1030_1$ $1030_{2a}$ and $1030_{2b}$. Thus, for example, in FIG. 11a only one laser channel (i.e., only one of the four lasers 340) scans the field of view $1030_1$ in a first horizontal range (e.g. a range of angles along the horizontal direction) and two laser channels (i.e., two of the four lasers 340) scan the field of view $1030_{2a}$, $1030_{2b}$ in a second horizontal range. In other words, in the first horizontal range one laser of the lasers 340 is selected for scanning (enabled), whereas the remaining three lasers of the lasers 340 are deselected for scanning (disabled) and in the second horizontal range two laser of the lasers 340 are selected for scanning (enabled), whereas the remaining two lasers of the lasers 340 are deselected for scanning (disabled). As a result, only the laser beams 335b and 335d scan the scenery. The lasers selected for scanning are, for example, operated in a part of the full horizontal scenery 330. In other words, only a part of the angular positions of the mirror 350 is selected for scanning by one or more lasers, whereas the remaining angular positions of the mirror are deselected for scanning.

According to an embodiment, shown in FIG. 11b, different numbers of laser channels can be repeatedly fired depending on the defined reduced field of view. The reduced field of view 1030 is, for example, subdivided into different rooms of interest $1030_{1a}$, $1030_{1b}$, $1030_2$, $1030_{3a}$ and $1030_{3b}$. Thus, for example, in FIG. 11b two laser channel (i.e., only one of the four lasers 340) scan the field of view $1030_{1a}$, $1030_{1b}$ in a first horizontal range (e.g. a range of angles along the horizontal direction), one laser channel scans the field of view $1030_2$ in a second horizontal range and two laser channels scan the field of view $1030_{3a}$, $1030_{3b}$ in a third horizontal range. In other words, in the first horizontal range two lasers of the lasers 340 are selected for scanning (enabled), whereas the remaining three lasers of the lasers 340 are deselected for scanning (disabled), in the second horizontal range one laser of the lasers 340 are selected for scanning (enabled), whereas the remaining two lasers of the lasers 340 are deselected for scanning (disabled) and in the third horizontal range again two lasers of the lasers 340 are selected for scanning (enabled), whereas the remaining three lasers of the lasers 340 are deselected for scanning (disabled). As a result, only the laser beams 335a, 335b and 335d scan the scenery. The lasers selected for scanning are, for example, operated in a part of the full horizontal scenery 330. In other words, only a part of the angular positions of the mirror 350 is selected for scanning by one or more lasers, whereas the remaining angular positions of the mirror are deselected for scanning.

The field of view 1030 shown in FIG. 11a or FIG. 11b is reduced relative to the full field of view (i.e. the scenery 330) of the LIDAR system 300. According to the embodiment shown in FIG. 11a or FIG. 11b, the field of view can change in the vertical direction for different angular ranges (i.e. horizontal ranges). Thus a vertical field of view and a horizontal field of view of the scenery 330 is, for example, spatially dependent reduced, which results in a reduced size of the field of view 1030 with respect to the full field of view of the LIDAR system 300. For example, only the pixels of the detector array 365 corresponding to the scanned areas ($1030_1$ $1030_{2a}$ and $1030_{2b}$ for FIG. 11a or $1030_{1a}$, $1030_{1b}$, $1030_2$, $1030_{3a}$ and $1030_{3b}$ for FIG. 11b) by the laser beams (335a and 335d for FIG. 11a or 335a, 335b and 335d for FIG. 11b) are read out and used in further processing.

In the following, several examples are described which may facilitate the change of the amplitude of the oscillations of the mirror 350. Those examples, individually or in any combination, may be applied in the examples of the present disclosure described above.

According to an example of the disclosure, in order for the controller to change the amplitude of the oscillations of the mirror, the integrators in the amplitude loop, e.g., in the loop 430 described in conjunction with FIG. 4, and in the current loop, e.g., in the loop 440 described in conjunction with FIG. 4, may be preloaded and fixed to values close to the expected ones after settling, in response to changing an amplitude set-point of the mirror 350. The PLL loop, e.g., the loop 410 described in conjunction with FIG. 4, may operate normally. The LIDAR system 300, e.g., the controller, may wait until the mirror 350 is close enough to the new amplitude (the amplitude set-point), e.g., until the difference between the amplitude of the oscillations of the mirror 350 and the set-point is lower than a threshold. As a further step, the loops may be released and a settled operation may be achieved. By fixing the amplitude loop steering the PLL in the proper direction may be achieved. The PLL loop is synchronized enough to the mirror such that the mirror energy increases in step-up amplitude switching.

According to an example of the disclosure, the preloading of the amplitude and current control loop may be implemented by using three 16 bit SFR registers to hold the preload values for MSBs of amplitude loop integrator and left/right current loop integrators and a 1 bit SFR field to enable the preloading of amplitude/current integrators (e.g., 1=preload and hold integrator values, 0=release amplitude/current loop). The remaining of the amplitude switching may be managed by the system via SPI based on the following steps: 1. loading amplitude/current preload values SFRs, 2. changing an amplitude set point and an angle detection window, 3. enabling amplitude/current loop preloading, 4. waiting a predetermined period of time, e.g., approximately 25 ms (note: the predetermined period of time may vary depending on an angle step size), and 5. releasing amplitude/current loops.

According to an example of the present disclosure, the expected value may be determined using a sinus function. In other words, the oscillations of the mirror 350 may be assumed to be sinusoidal. In the exemplary implementation described in conjunction with FIGS. 4, 5 and 6 above, the amplitude of the sinusoidal waveform may be determined by using equation (1):

$$Angle_{max} = \frac{6}{\cos\left(\frac{\pi}{2^{14}}(acdl\_setpoint - 2^{13})\right)} \quad (1)$$

wherein the constant 6 in the numerator corresponds to the exemplary peak at 6° described in conjunction with FIG. 4.

In other words, in order to facilitate the change of the amplitude of the mirror 350, control parameters, e.g., the pre-load and fix as described above, or structure change, e.g., full feed-forward control, may be used. The parameters and/or structures of the control loops (regulators) may be typically tuned to suppress jitter caused by external vibrations or to make the MEMS mirror motion as accurate as possible, e.g., during the regular steady state operation of the MEMS mirror. However, these parameters and/or structures may not be optimal for a fast switching of the amplitude. Therefore, the use of temporary parameters and/or structures of the regulators may be advantageous in order to achieve a fast switching of the amplitude of the oscillations of the mirror.

According to another example of the disclosure, the phase of the PLL loop, e.g., the loop 410 described in conjunction with FIG. 4, may be changed in order to facilitate the change of the amplitude of the mirror. For example, active braking of the MEMS mirror may be applied. For example, when changing to lower oscillation amplitude, the phase of the actuation may be temporarily inverted. As a result, energy may be extracted from the oscillator (i.e., the mirror system) as quickly as possible, assisting the natural decay. The period of time of applying the active braking may be in order of 100 ms, and it may be determined by calculations, simulations or experimentally. This period of time may depend on the previous and target angle. In another example, the MEMS mirror may be operated at a phase being lower than a threshold, e.g., a zero phase. This condition may lead to the most efficient actuation, and may be advantageous for increasing the amplitude of the oscillation as quickly as possible.

According to a further example of the disclosure, the drive voltage, i.e., the voltage applied to the electrostatic drive, may be temporarily increased (or decreased) in order to facilitate the change of the amplitude of the mirror. For example, the electrostatic force may correspond (e.g., may be proportional) to the voltage applied to the electrostatic drive.

According to another example of the disclosure, the pulses of the lasers 340 may be concentrated on specific locations (e.g., region of interest). This may advantageously allow for locally increasing SNR, which in turn may lead to an improved range and/or detectability and/or confidence level. A horizontal ROI may advantageously allow for oversampling, which in turn may increase resolution. For example, the lasers 340 may be fired (as an alternative or in addition) not only at nominal (e.g., integer) pixels such as at 0, 1, 2, 3, etc., but also in between them such as at 0.5, 1.5, 2.5, 3.5, etc. This example may advantageously allow for increasing resolution and may be particularly advantageous when the mirror 350 is moving slowly relative to its nominal operating. In addition, the detectability of tiny objects may be advantageously increased since, for example, the peak of the horizontal distribution of the laser power is more likely to hit (reach) the tiny object. In a further example, only a single layer of the lasers 340 may be fired, for instance, out of a stack (e.g., a triple-stack) of emitting lasers.

The duration of time of the temporal change of any parameters and/or structures as described in conjunction with the examples explained above may be determined based on the current amplitude of the mirror, the target amplitude of the mirror, mirror parameters or the like. The duration of the temporal change may be determined by calculations, simulations or the like, or may be determined experimentally, e.g., by measurements.

It is understood that the receiver, the LIDAR system and the method of examples of the present disclosure are not limited to the orientation of the axis of the mirror in accordance with the examples described above. Rather, the axis of the mirror may assume any orientation in the 3D space. In other words, the references to the vertical and horizontal direction are intended to be for illustrative purposes only.

Additional embodiments and aspects are described which may be used alone or in combination with the features and functionalities described herein.

According to an aspect, a light detection and ranging, LIDAR, system comprises: at least two lasers configured to emit aligned beams of light a mirror configured to deflect the beams of light emitted by the lasers, the mirror supported to be pivotable with respect to an axis of the mirror so as to allow the beams of light to scan a field of view of the LIDAR system; a drive configured to drive the mirror into oscillations; and a controller configured to control at least one laser so as to selectively change a size of the field of view and/or to control the drive so as to selectively change the size of the field of view.

According to an aspect, the controller is configured to selectively change the size of the field of view for at least a duration of a scan of the field of view.

According to an aspect, the controller is configured to selectively change the size of the field of view based on information obtained from one or more previous scans of the field of view, and/or based on information provided to the LIDAR system by an external controller and/or by a user of the LIDAR system.

According to an aspect, the at least two lasers comprise a first subset of one or more lasers and a second subset of one or more lasers, and the controller is configured to select for scanning the lasers of the first subset and deselect for scanning the lasers of the second subset so as to reduce the size of the field of view in a first direction.

According to an aspect, the controller is configured to operate the lasers of the first subset at a pulse repetition frequency which is greater than a pulse repetition frequency in another mode of operation of the LIDAR system, in which the lasers of both the first subset and the second subset are selected for scanning.

According to an aspect, the controller is configured to select for scanning at least one laser when a value representing an angular position of the oscillating mirror is within a first range of values and deselect for scanning the at least one laser when the value representing the angular position of the oscillating mirror is within a second range of values so as to reduce the size of the field of view in a second direction.

According to an aspect, the controller is configured to, when the value representing the angular position of the oscillating mirror is within the first range of values, operate the at least one laser at a pulse repetition frequency, which is greater than a pulse repetition frequency in another mode of operation of the LIDAR system, in which the at least one laser is selected for scanning when the value representing the angular position of the oscillating mirror is within the first range of values or the second range of values.

According to an aspect, the controller is configured to adjust an amplitude of the oscillations of the mirror to correspond to an amplitude reference value so as to reduce the size of the field of view in a second direction.

According to an aspect, the controller is configured to limit a rate of change of the amplitude reference value such that the rate of change is below a predetermined value.

According to an aspect, the controller is configured to, in response to determining a change in the amplitude reference value, deselect for scanning at least one laser of the LIDAR system for a predetermined period of time.

According to an aspect, the controller is configured to, in response to determining a change in the amplitude reference value, replace one or more parameters of a regulator used to adjust an amplitude of the oscillations of the mirror with temporary parameters for a predetermined period of time.

According to an aspect, the controller is configured to, in response to determining a change in the amplitude reference value, replace structure of a regulator used to adjust an amplitude of the oscillations of the mirror with a temporary structure for a predetermined period of time.

According to an aspect, the regulator comprises at least one integral component, and the controller is configured to, in response to determining a change in the amplitude reference value, disable the regulator, then set a predetermined value as an output of the integral component of the regulator, and then enable the regulator.

According to an aspect, the predetermined value is a value expected to be assumed when the amplitude of the oscillations of the mirror corresponds to the amplitude reference value.

According to an aspect, the drive is an electrostatic drive to which a voltage is alternately switched to drive the mirror into oscillations, and the controller is configured to, in response to determining a change in the amplitude reference value, if the change in the amplitude reference value is negative, invert the voltage being alternately switched to the electrostatic drive for a predetermined period of time.

According to an aspect, the drive is an electrostatic drive to which a voltage is alternately switched to drive the mirror into oscillations, and the controller is configured to, in response to determining a change in the amplitude reference value, if the change in the amplitude reference value is positive, control the drive for a predetermined period of time such that a phase between the voltage applied to the electrostatic drive and an oscillating motion of the mirror is lower than a predetermined value.

According to an aspect, the drive is an electrostatic drive to which a voltage is alternately switched to drive the mirror into oscillations, and the controller is configured to, in response to determining a change in the amplitude reference value, adjust the amplitude of the voltage applied to the electrostatic drive for a predetermined period of time such that the amplitude of the voltage is increased if the change in the amplitude of the reference value is positive and the amplitude of the voltage is decreased if the change in the amplitude of the reference value is negative.

According to an aspect, the drive is an electrostatic drive to which a voltage is alternately switched to drive the mirror into oscillations, and the controller is configured to, in response to determining a change in the amplitude reference value, set a switch-off time of the voltage to a predetermined value in dependence on the amplitude reference value.

According to an aspect, the LIDAR system is configured to selectively deactivate one or more elements of a receiving chain which correspond to the lasers which are deselected for scanning.

According to an aspect, a method of operating a light detection and ranging, LIDAR, system, the LIDAR system comprising at least two lasers configured to emit aligned beams of light, a mirror configured to deflect the beams of light emitted by the lasers, the mirror supported to be pivotable with respect to an axis of the mirror so as to allow the beams of light to scan a field of view of the LIDAR system, and a drive configured to drive the mirror into oscillations, the method comprising: controlling (210) at least one laser so as to selectively change a size of the field of view; and/or controlling (220) the drive so as to selectively change the size of the field of view.

An aspect relates to a computer program for performing a herein described method when the computer program runs on a controller or on a computer.

In the following, further examples of the disclosure are described. The examples described below may constitute alternatives or may be considered in addition to the aspects disclosed above.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, one or more of the most important method steps may be executed by such an apparatus.

Depending on certain implementation requirements, examples of the disclosure can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Generally, examples of the disclosure can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of the disclosure is, therefore, a computer program having a program code for performing one of the methods described herein, when the computer program runs on a computer.

A further example of the disclosed methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further example of the disclosed methods is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example of the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described examples are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

What is claimed is:

1. A light detection and ranging (LIDAR) system, comprising:
   at least two lasers configured to emit aligned beams of light;
   a mirror configured to deflect the aligned beams of light, the mirror pivotable with respect to an axis of the mirror so as to allow the aligned beams of light to scan a field of view of the LIDAR system;
   a driver configured to drive the mirror into oscillations about the axis as an oscillating mirror; and
   a controller configured to control at least one laser of the at least two lasers so as to selectively change a size of the field of view,
      wherein in a first mode of operation, the controller is configured to:
         select the at least one laser for scanning when a value representing an angular position of the mirror in oscillation is within a first range of values, and
         deselect the at least one laser for scanning when the value representing the angular position of the mirror in oscillation is within a second range of values.

2. The LIDAR system of claim 1, wherein:
   the controller is configured to selectively change the size of the field of view for at least a duration of a scan of the field of view.

3. The LIDAR system of claim 1, wherein the controller is configured to selectively change the size of the field of view based on:
   information obtained from one or more previous scans of the field of view, or
   information provided to the LIDAR system by an external controller or by a user input provided to the LIDAR system.

4. The LIDAR system of claim 1, wherein:
   in a first mode of operation, the controller is configured to, when the value representing the angular position of the oscillating mirror is within the first range of values, operate the at least one laser at a first pulse repetition frequency, and
   in a second mode of operation, the controller is configured to, when the value representing the angular position of the oscillating mirror is within the first range of values and the second range of values, operate the at least one laser at a second pulse repetition frequency less than the first pulse repetition frequency.

5. The LIDAR system of claim 1, wherein the controller is configured to control the driver so as to selectively change the size of the field of view.

6. The LIDAR system of claim 1, wherein:
   the LIDAR system is configured to selectively deactivate one or more elements of a receiving chain which correspond to the at least one laser which is deselected for scanning.

7. The LIDAR system of claim 1, wherein:
   the controller is configured to, in response to determining a change in an amplitude reference value, replace one or more parameters of a regulator used to adjust an amplitude of the oscillations of the mirror with temporary parameters for a predetermined period of time.

8. The LIDAR system of claim 1, wherein:
   the selecting and the deselecting in response to determining a change in an amplitude reference value.

9. The LIDAR system of claim 1, wherein:
   the driver is an electrostatic driver to which a voltage is alternately switched to drive the mirror into the oscillations, and
   the controller is configured to, in response to determining a change in an amplitude reference value, if the change in an amplitude reference value is negative, invert the voltage being alternately switched to the electrostatic driver for a predetermined period of time.

10. The LIDAR system of claim 1, wherein:
    the driver is an electrostatic driver to which a voltage is alternately switched to drive the mirror into the oscillations, and
    the controller is configured to, in response to determining a change in an amplitude reference value, if the change in an amplitude reference value is positive, control the driver for a predetermined period of time such that a phase between the voltage applied to the electrostatic driver and an oscillating motion of the mirror is lower than a predetermined value.

11. A light detection and ranging (LIDAR) system, comprising:
    at least two lasers configured to emit aligned beams of light;
    a mirror configured to deflect the aligned beams of light, the mirror pivotable with respect to an axis of the mirror so as to allow the aligned beams of light to scan a field of view of the LIDAR system;
    a driver configured to drive the mirror into oscillations about the axis as an oscillating mirror; and
    a controller configured to control the driver so as to selectively change a size of the field of view,
       wherein at least one of:
          the controller is configured to, in response to determining a change in an amplitude reference value, deselect at least one laser of the at least two lasers for scanning for a predetermined period of time, or
          the controller is configured to, in response to determining the change in the amplitude reference value, replace a structural component of a regulator used to adjust an amplitude of the oscillations of the mirror with a temporary structural component for the predetermined period of time.

12. The LIDAR system of claim 11, wherein:
    the controller is configured to adjust the amplitude of the oscillations of the mirror to correspond to the amplitude reference value.

13. The LIDAR system of claim 11, wherein:
    the controller is configured to limit a rate of change of the amplitude reference value such that the rate of change is below a predetermined value.

14. The LIDAR system of claim 11, wherein:
    the controller is configured to, in response to determining the change in the amplitude reference value, deselect the at least one laser of the at least two lasers for scanning for the predetermined period of time.

15. The LIDAR system of claim 11, wherein:
    the controller is configured to, in response to determining the change in the amplitude reference value, replace one or more parameters of the regulator used to adjust the amplitude of the oscillations of the mirror with temporary parameters for the predetermined period of time.

16. The LIDAR system of claim 11, wherein:
the controller is configured to, in response to determining the change in the amplitude reference value, replace the structural component of the regulator used to adjust the amplitude of the oscillations of the mirror with the temporary structural component for the predetermined period of time.

17. The LIDAR system of claim 11, wherein:
the regulator comprises at least one integral component, and
the controller is configured to, in response to determining the change in the amplitude reference value, disable the regulator, then set a predetermined value as an output of the integral component of the regulator, and then enable the regulator.

18. The LIDAR system of claim 17, wherein:
the predetermined value is a value expected to be assumed when the amplitude of the oscillations of the mirror corresponds to the amplitude reference value.

19. The LIDAR system of claim 11, wherein:
the driver is an electrostatic driver to which a voltage is alternately switched to drive the mirror into the oscillations, and
the controller is configured to, in response to determining the change in the amplitude reference value, if the change in the amplitude reference value is negative, invert the voltage being alternately switched to the electrostatic driver for the predetermined period of time.

20. The LIDAR system of claim 11, wherein:
the driver is an electrostatic driver to which a voltage is alternately switched to drive the mirror into the oscillations, and
the controller is configured to, in response to determining the change in the amplitude reference value, if the change in the amplitude reference value is positive, control the driver for the predetermined period of time such that a phase between the voltage applied to the electrostatic driver and an oscillating motion of the mirror is lower than a predetermined value.

21. The LIDAR system of claim 11, wherein:
the driver is an electrostatic driver to which a voltage is alternately switched to drive the mirror into the oscillations, and
the controller is configured to, in response to determining the change in the amplitude reference value, adjust an amplitude of the voltage applied to the electrostatic driver for the predetermined period of time such that the amplitude of the voltage is increased if the change in the amplitude of the reference value is positive and the amplitude of the voltage is decreased if the change in the amplitude of the reference value is negative.

22. The LIDAR system of claim 11, wherein:
the driver is an electrostatic driver to which a voltage is alternately switched to drive the mirror into the oscillations, and
the controller is configured to, in response to determining the change in the amplitude reference value, set a switch-off time of the voltage to a predetermined value in dependence on the amplitude reference value.

23. A method of operating a light detection and ranging (LIDAR) system, the LIDAR system comprising at least two lasers configured to emit aligned beams of light, a mirror configured to deflect the aligned beams of light, the mirror pivotable with respect to an axis of the mirror so as to allow the aligned beams of light to scan a field of view of the LIDAR system, and a driver configured to drive the mirror into oscillations, the method comprising:
deselecting, based on determining a change in an amplitude reference value, at least one laser of the two lasers for scanning for a predetermined period of time so as to selectively change a size of the field of view; or
replacing, in response to determining the change in the amplitude reference value, a structural component of a regulator used to adjust an amplitude of the oscillations of the mirror with a temporary structural component for the predetermined period of time.

24. A non-transitory computer-readable storage medium comprising a computer program which, when executed by a processor, cause the processor to perform the method of claim 23.

* * * * *